(12) United States Patent
Lee et al.

(10) Patent No.: US 8,351,375 B2
(45) Date of Patent: Jan. 8, 2013

(54) METHOD AND APPARATUS OF PERFORMING CELL RE-SEARCH BETWEEN HETEROGENEOUS NETWORKS

(75) Inventors: Jong Hoon Lee, Anyang-si (KR); Li-Hsiang Sun, Anyang-si (KR); Sang Won Lee, Anyang-si (KR); Seong Jin Park, Anyang-si (KR); In Kyung Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 684 days.

(21) Appl. No.: 12/461,736

(22) Filed: Aug. 21, 2009

(65) Prior Publication Data

US 2010/0046428 A1 Feb. 25, 2010

Related U.S. Application Data

(60) Provisional application No. 61/090,908, filed on Aug. 22, 2008, provisional application No. 61/092,753, filed on Aug. 29, 2008, provisional application No. 61/099,569, filed on Sep. 24, 2008, provisional application No. 61/106,980, filed on Oct. 21, 2008, provisional application No. 61/169,716, filed on Apr. 15, 2009.

(30) Foreign Application Priority Data

Feb. 17, 2009 (KR) .......................... 10-2009-0013093

(51) Int. Cl.
  *H04W 4/00* (2009.01)
(52) U.S. Cl. ........................................ 370/328
(58) Field of Classification Search ............ 370/252, 370/328, 331; 455/423, 434, 436–444
See application file for complete search history.

(56) References Cited

U.S. PATENT DOCUMENTS

| | | | |
|---|---|---|---|
| 6,549,779 B1 | 4/2003 | Muller et al. | |
| 7,181,218 B2 | 2/2007 | Ovesjo et al. | |
| 7,203,506 B2 * | 4/2007 | Kim et al. | 455/466 |
| 2003/0017831 A1 * | 1/2003 | Lee et al. | 455/453 |

(Continued)

FOREIGN PATENT DOCUMENTS

JP 2005-508588 A 3/2005

(Continued)

OTHER PUBLICATIONS

Cdma2000 High Rate Packet Data Air Interface Specification, $3^{rd}$ Generation Partnership Project 2 "3GPP2", 3GPP2 C.S0024-B, version 2.0, Mar. 2007, pp. 7-252 to 7-276.

(Continued)

*Primary Examiner* — Mark Rinehart
*Assistant Examiner* — Peter Cheng
(74) *Attorney, Agent, or Firm* — McKenna Long & Aldridge LLP (57) ABSTRACT

A method and apparatus of performing cell re-search between heterogeneous networks is provided. A mobile terminal (MT) accesses to a high rate packet data (HRPD) network. The MT receives a first message from the HRPD network. The first message includes neighbor radio access technology (RAT) indicator which indicates whether neighbor RAT information used to perform inter-RAT measurement is transmitted from the HRPD network. The MT receives a second message from the HRPD network if the neighbor RAT indicator indicates the transmission of the neighbor RAT information. The second message includes the neighbor RAT information. The MT performs cell re-search on the basis of the neighbor RAT information.

8 Claims, 5 Drawing Sheets

U.S. PATENT DOCUMENTS

| | | | |
|---|---|---|---|
| 2003/0190937 A1* | 10/2003 | Karmi et al. | 455/574 |
| 2006/0040700 A1 | 2/2006 | Roberts et al. | |
| 2006/0109161 A1 | 5/2006 | Krikorian et al. | |
| 2007/0014260 A1* | 1/2007 | Seo | 370/331 |
| 2008/0064397 A1* | 3/2008 | Park et al. | 455/434 |

FOREIGN PATENT DOCUMENTS

| | | |
|---|---|---|
| JP | 2005-101815 A | 4/2005 |
| JP | 2006-229918 A | 8/2006 |
| JP | 2008-113253 A | 5/2008 |
| KR | 10-0602166 | 7/2006 |
| KR | 10-0689425 | 3/2007 |
| WO | WO 03/009633 A1 | 1/2003 |
| WO | WO 2005/089009 | 9/2005 |
| WO | WO 2006/109161 A2 | 10/2006 |
| WO | WO 2008/060236 A2 | 5/2008 |

OTHER PUBLICATIONS

"Recommended System Selection Requirements for 1X and 1xEV-DO-Capable Terminals", CDG Document 143, Version 1.1, Mar. 15, 2007, pp. I-VI, CDMA Development Group 575 Anton Boulevard, Suite 560, Costa Mesa, California, XP-002599308.

* cited by examiner

METHOD AND APPARATUS OF PERFORMING CELL RE-SEARCH BETWEEN HETEROGENEOUS NETWORKS

CROSS-REFERENCE TO RELATED APPLICATIONS

This application claims the benefit of priority of U.S. Provisional application No. 61/090,908 filed on Aug. 22, 2008, U.S. Provisional application No. 61/092,753 filed on Aug. 29, 2008, U.S. Provisional application No. 61/099,569 filed on Sep. 24, 2008, U.S. Provisional application No. 61/106,980 filed on Oct. 21, 2008, U.S. Provisional application No. 61/169,716 filed on Apr. 15, 2009, and Korean Patent Application No. 10-2009-0013093 filed on Feb. 17, 2009, all of which are incorporated by reference in their entirety herein.

BACKGROUND OF THE INVENTION

1. Field of the Invention

The present invention relates to wireless communications, and more particularly, to a method and apparatus of performing cell re-search between heterogeneous networks.

2. Related Art

Wireless communication systems are widely spread all over the world to provide various types of communication services such as voice or data. In general, the wireless communication system is a multiple access system capable of supporting communication with multiple users by sharing available radio resources. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

CDMA2000 supports a voice service and a data service through a CDMA channel. Standards included in the CDMA2000 are IS-2000, IS-95, and IS-895. EV-DO is a part of the CDMA2000 and is a 3-rd generation CDMA standard. The EV-DO provides a packet data service with a high data rate. The EV-DO originally stands for "EVolution, Data-Only", and is recently also referred to as "EVolution, Data-Optimized". The EV-DO is based on high rate packet data (HRPD) defined by the 3-rd generation partnership project 2 (3GPP2) standardization organization. The HRPD is a high-speed CDMA-based radio data technology developed by Qualcomm Inc.

With the widespread use of wireless communication systems developed into various systems, there are many cases where heterogeneous networks coexist in the same region. The heterogeneous networks are networks that implement different radio access technologies (RATs). For example, a wideband-CDMA (WCDMA) system and an HRPD system may coexist in one region.

A mobile terminal needs to perform a handover between the heterogeneous networks for various reasons such as a required quality of service (QoS), a load of a base station, and so on. Accordingly, there is a need for a method of performing cell re-search to effectively support a handover between heterogeneous networks.

SUMMARY OF THE INVENTION

The present invention provides a method and apparatus of performing cell re-search between heterogeneous networks.

The present invention also provides a method and apparatus of transmitting neighbor RAT information.

In an aspect, a method of performing cell re-search between heterogeneous networks is provided. A mobile terminal (MT) accesses to a high rate packet data (HRPD) network. The MT receives a first message from the HRPD network. The first message includes neighbor radio access technology (RAT) indicator which indicates whether neighbor RAT information used to perform inter-RAT measurement is transmitted from the HRPD network. The MT receives a second message from the HRPD network if the neighbor RAT indicator indicates the transmission of the neighbor RAT information. The second message includes the neighbor RAT information. The MT performs cell re-search on the basis of the neighbor RAT information.

The first message may further include an RAT transmission period which is a period used to transmit the second message by the HRPD network. The first message may further include a signature which is set to the same value as in a signature in the second message.

The first message may be a QuickConfig message which is broadcast by the HRPD network. The second message may be broadcast by the HRPD network.

The neighbor RAT information may include a type of a neighbor RAT and record of the neighbor RAT.

In another aspect, a MT includes a first RAT modem for supporting a first RAT, a second RAT modem for supporting a second RAT, and a controller operatively coupled with the first RAT modem and the second RAT modem. The controller is configured to access to a first RAT, receive a first message from the first RAT, the first message comprising neighbor RAT indicator which indicates whether neighbor RAT information used to perform inter-RAT measurement is transmitted from the first RAT, receive a second message from the first RAT if the neighbor RAT indicator indicates the transmission of the neighbor RAT information, the second message comprising the neighbor RAT information, and perform cell re-search on the basis of the neighbor RAT information.

In still another aspect, a method of transmitting RAT information is provided. A base station transmits a first message to at least one MT. The first message includes a neighbor radio access technology (RAT) indicator which indicates whether neighbor RAT information used to perform inter-RAT measurement by the at least one MT is transmitted. The base station transmits a second message to the at least one MT if the neighbor RAT indicator indicates the transmission of the neighbor RAT information. The second message includes the neighbor RAT information.

A mobile terminal can perform cell re-search according to neighbor radio access technology (RAT) information. Power consumption caused by measurement of a neighbor RAT can be reduced. Accordingly, a handover can be effectively performed between heterogeneous networks.

DESCRIPTION OF EXEMPLARY EMBODIMENTS

Code division multiple access (CDMA) can be applied to a radio technology such as CDMA2000. High rate packet data (HRPD) defined by the 3-rd generation partnership project 2 (3GPP2) standardization organization provides a packet data service with a high data rate in a CDMA2000-based system. Evolved HRPD (eHRPD) is an evolution of the HRPD. Hereinafter, the HRPD may be the conventional HRPD and/or the eHRPD. Wideband CDMA (WCDMA) can be implemented by a radio technology such as a universal terrestrial radio access network (URTAN) defined by the 3GPP standardization organization. Time division multiple access (TDMA) can be implemented by a radio technology such as global system for mobile communications (GSM)/general packet radio service (GPRS)/enhanced data rates for GSM evolution (EDGE). Orthogonal frequency division multiple access (OFDMA) can be implemented by a radio access technology such as IEEE 802.11 (Wi-Fi), IEEE 802.16 (WiMAX), IEEE 802-20, evolved-UTRAN (E-UTRAN), and so on. Long term evolution (LTE) is a part of an evolved-universal mobile telecommunications system (E-UMTS) using the E-UTRAN. The 3GPP LTE employs the OFDMA in downlink transmission and employs a single carrier-frequency division multiple access (SC-FDMA) in uplink transmission. LTE-advance (LTE-A) is an evolution of the LTE.

A mobile terminal (MT) may be fixed or mobile, and may be referred to as another terminology, such as a user equipment (UE), a mobile station (MS), a user terminal (UT), a subscriber station (SS), a wireless device, a personal digital assistant (PDA), a wireless modem, a handheld device, an access terminal (AT), etc. A base station (BS) is generally a fixed station that communicates with the MT and may be referred to as another terminology, such as an evolved node-B (eNB), a base transceiver system (BTS), an access point, an access network (AN), etc. Downlink denotes communication link from the BS to the MT, and uplink denotes communication link from the MT to the BS. In the downlink, a transmitter may be a part of the BS, and a receiver may be a part of the MT. In the uplink, the transmitter may be a part of the MT, and the receiver may be a part of the BS.

A handover, also referred to as a handoff, is defined as a process in which a MT moves from one BS (i.e., a serving BS), from which the MT receives a service, to another BS (i.e., a target BS). Heterogeneous networks are networks using different radio access technologies (RATs). A handover between the heterogeneous networks includes a handover between the HRPD and the E-UTRAN, a handover between the HRPD and the UTRAN, a handover between the HRPD and the WiMAX, and a handover between the HRPD and the GSM/GPRS/EDGE.

Figure 1:
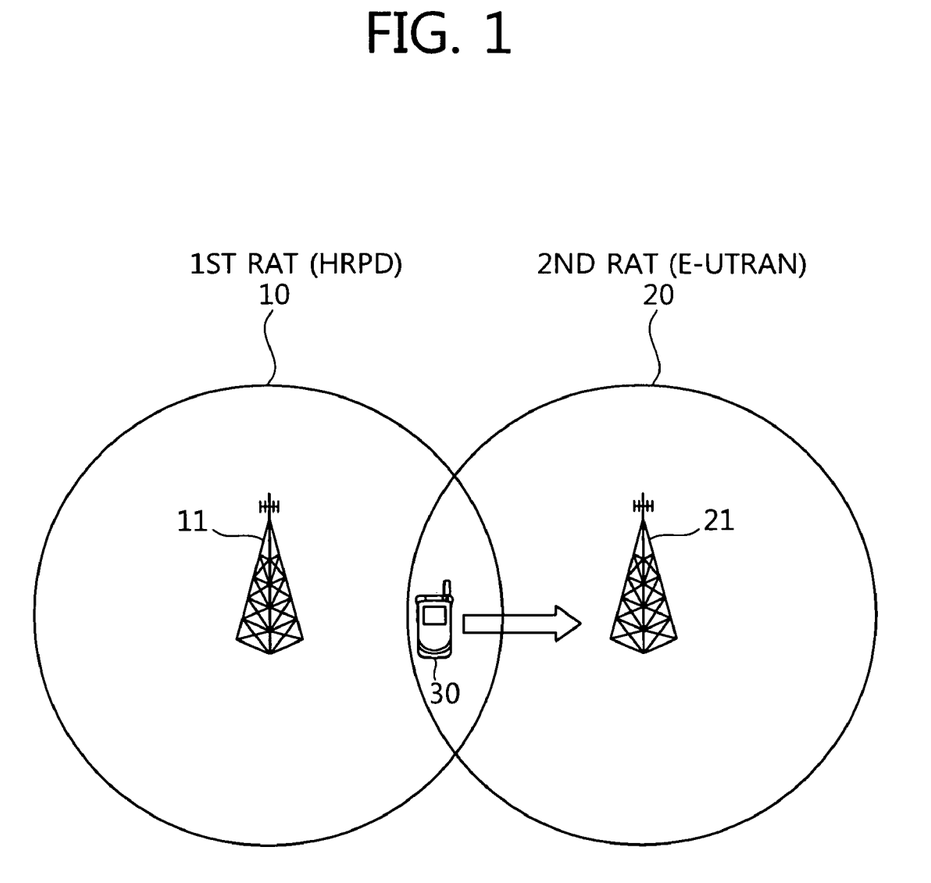
FIG. 1 shows a handover between heterogeneous networks.

FIG. 1 shows a handover between heterogeneous networks. An RAT including a serving BS 11 from which a MT 30 is currently receiving a service is referred to as a serving RAT (or a first RAT 10), and this RAT 10 is based on the HRPD. An RAT including a target BS 21 to which the MT 30 intends to move by a handover is referred to as a target RAT (or a second RAT 20), and this RAT 20 is based on the E-UTRAN.

As for the handover between the heterogeneous networks, a handover from an HRPD to an E-UTRAN (or also referred to as an LTE) is considered. However, this is for exemplary purposes only, and thus the RAT of the target RAT is not limited thereto. Technical features of the present invention can also apply to a handover from the serving RAT based on the HRPD to a neighbor RAT.

Figure 2:
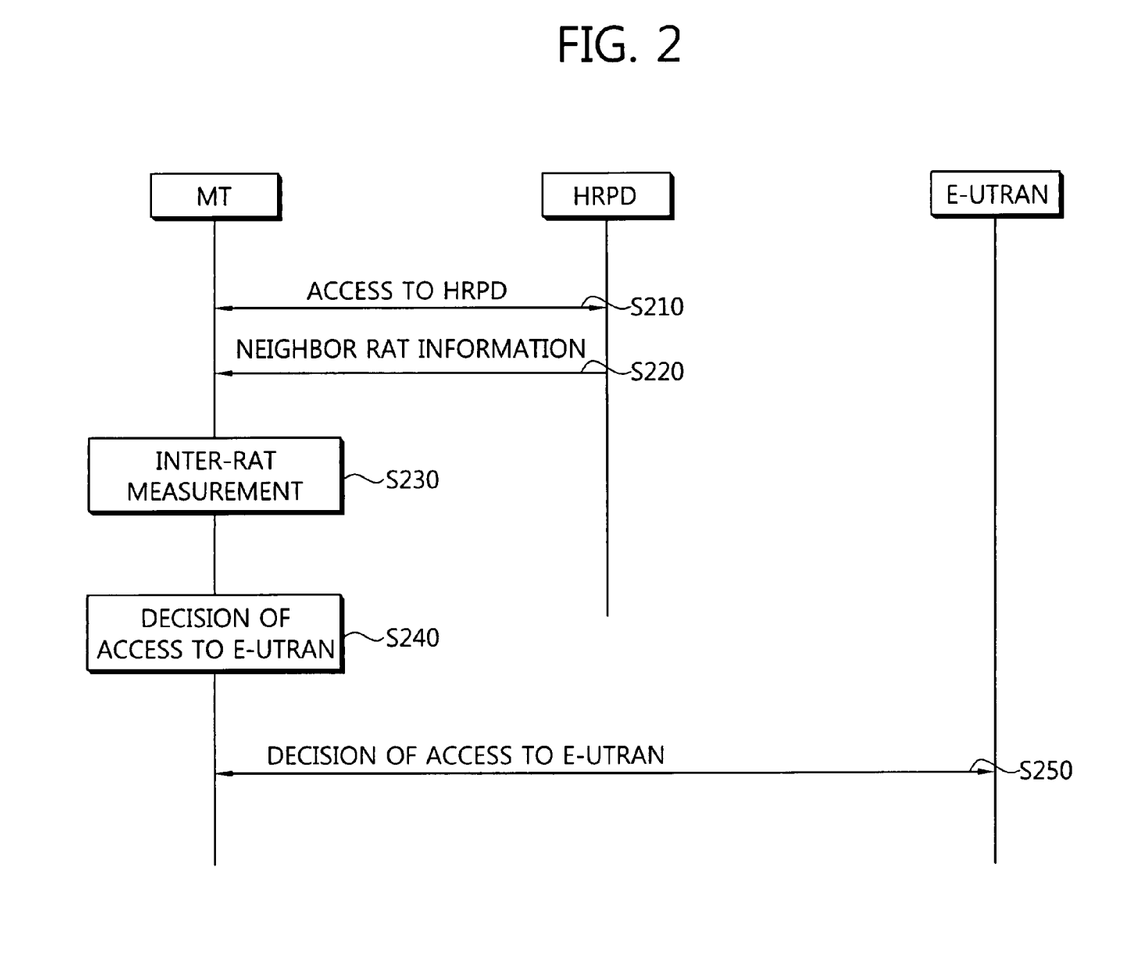
FIG. 2 shows a method of performing cell re-search between heterogeneous networks according to an embodiment of the present invention.

FIG. 2 shows a method of performing cell re-search between heterogeneous networks according to an embodiment of the present invention. The cell re-search includes cell measurement for performing a handover when accessed to a serving cell and/or decision to access to a new cell.

Referring to FIG. 2, in step S210, after power is on, a MT enters to HRPD by attempting to access to an HRPD network. The HRPD is a serving RAT.

In step S220, the HRPD transmits neighbor RAT information to the MT. The neighbor RAT information is information used by the MT to perform measurement between heterogeneous RATs (hereinafter, inter-RAT measurement). The neighbor RAT information may include any one of a type of a neighbor RAT, whether the MT is located at a boundary of the neighbor RAT, a neighbor RAT list, and a priority of the neighbor RAT. The neighbor RAT information can be delivered by using a broadcast message and/or a unicast message. The broadcast message is a message transmitted by a network to all MTs in a cell, and may be system information required for keeping connection between the network and the MT. The broadcast message is also referred to as an overhead message. The unicast message is a message transmitted by the network to one or more MTs, and may be any one of a radio resource control (RRC) message, a medium access control (MAC) message, and a physical layer message.

In step S230, the MT performs inter-RAT measurement according to the neighbor RAT information.

In step S240, the MT decides whether handover to a neighbor RAT, i.e., E-UTRAN, is performed according to a measurement result. The handover decision can be reported to the HRPD after being determined by the MT according to the inter-RAT measurement result. Alternatively, the MT may transmit the inter-RAT measurement result to the HRPD, and the HRPD may instruct the MT to handover to the E-UTRAN.

In step S250, the MT attempts to access to the E-UTRAN when decision of handover is confirmed.

Whether the MT is located at a boundary of a different RAT can be known by using the neighbor RAT information. Inter-RAT measurement starts when the MT is located at the boundary of the different RAT. Power consumption caused by the inter-RAT measurement can be reduced.

Figure 3:
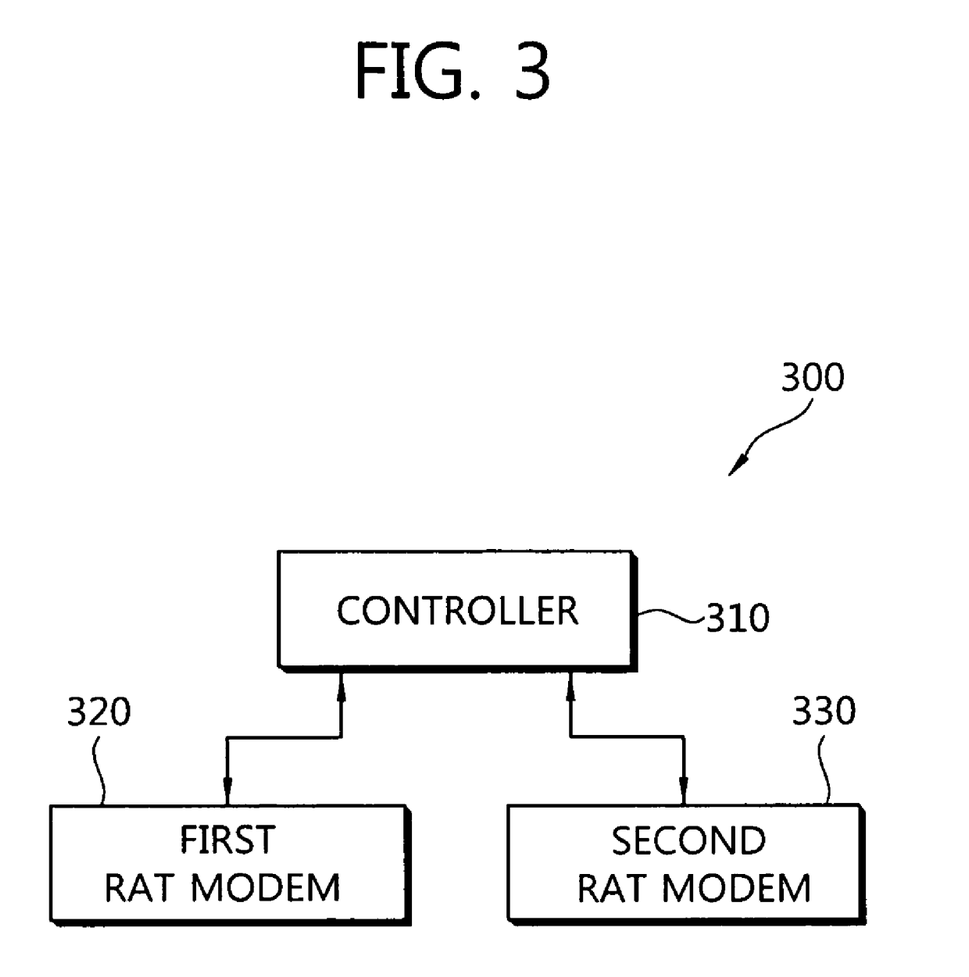
FIG. 3 is a block diagram of a MT to implement an embodiment of the present invention.

FIG. 3 is a block diagram of a MT to implement an embodiment of the present invention. A MT 300 includes a controller 310, a first RAT modem 320, and a second RAT modem 330. Since the MT supports two different networks, the MT may be referred to as a dual mode MT. The first RAT modem 320 supports communication with a first RAT. The second RAT modem 330 supports communication with a second RAT. The controller 310 is operatively coupled with the first RAT modem 320 and the second RAT modem 330, and implements cell re-search (or handover) between the first RAT and the second RAT.

Assume that the first RAT is a serving RAT currently connected to the network. In this case, since no communication is made to the second RAT, the second RAT modem 330 operates in a sleep mode to minimize power consumption. The controller 310 receives neighbor RAT information from the first RAT, and thus determines whether the MT enters a boundary of the second RAT. If it is determined that the MT enters the boundary of the second RAT or a by using the neighbor RAT information, the controller 310 controls the second RAT modem 300 to wake up from the sleep mode to perform cell re-search.

In order for the MT to handover to a different RAT, the different RAT may be periodically/aperiodically searched for, and thus the second RAT modem 330 operates whenever the different RAT is searched for. Battery consumption of the MT may increase when the second RAT modem 330 continuously operates for performing inter-RAT measurement and cell re-search. An operation time of the second RAT modem 330 can be adjusted by instructing the MT to perform cell search when the MT enters a heterogeneous network. Therefore, the MT can decrease its battery consumption caused by the inter-RAT measurement and the handover.

Now, a method of performing cell re-research will be described in greater detail.

Figure 4:
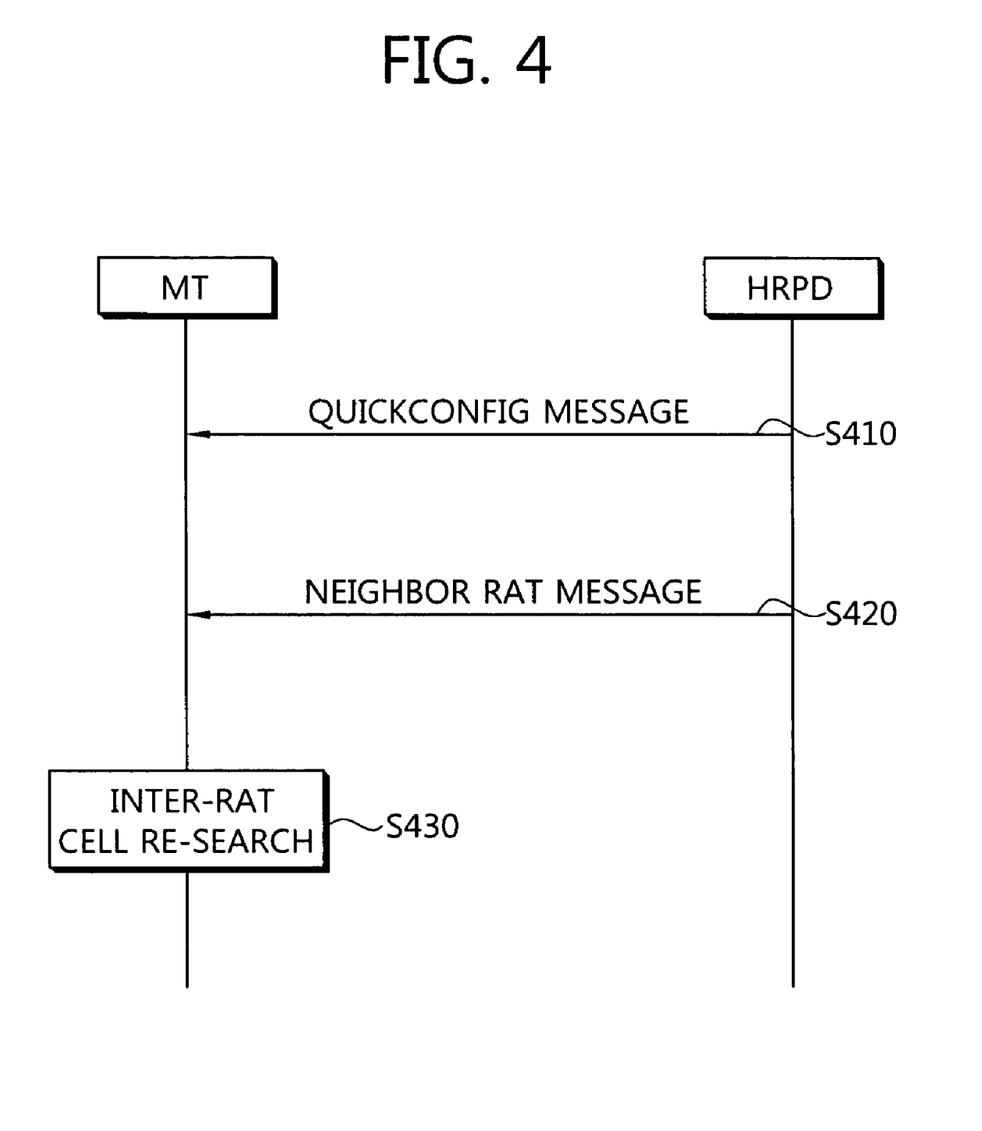
FIG. 4 is a flowchart showing transmission of neighbor radio access technology (RAT) information according to an embodiment of the present invention.

FIG. 4 is a flowchart showing transmission of neighbor RAT information according to an embodiment of the present invention. In step S410, an HRPD network transmits a Quick-Config message. This message is referred to as a first message. According to clause 7.11 of the 3GPP2 C.S0024 "CDMA2000 High Rate Packet Data Air Interface" Version 2.0 released in March of 2007, broadcast information of the HRPD network is delivered using an overhead message. An overhead message protocol (OMP) provides a procedure related to transmission and reception of the overhead message. The QuickConfig message is broadcast on a control channel by the network, and carries information on whether there is a change in the content of messages and to provide frequently changing information.

The QuickConfig message may includes information on whether a neighbor RAT message that carries neighbor RAT information is transmitted. The following table shows an example of fields included in the QuickConfig message.

TABLE 1

| Field | Content |
| --- | --- |
| Message ID | Identifier (ID) of QuickConfig message |
| Sector ID | Sector ID of current sector |
| Sector Signature | Signature value of next sector parameter message |
| Access Signature | Signature value of access parameter message |
| Neighbor RAT Indicator | Indicates transmission of neighbor RAT message |
| RAT Transmission Period | Indicates the RAT transmission period |

A 'neighbor RAT indicator' indicates whether neighbor RAT information is transmitted. For example, it is assumed that the neighbor RAT indicator is 1-bit information. If the neighbor RAT indicator is set to '1', the HRPD network may broadcast the neighbor RAT message. If the neighbor RAT indicator is set to '0', the HRPD network does not transmit the neighbor RAT message, and the MT does not wait to receive the neighbor RAT message.

In step S420, the HRPD network transmits the neighbor RAT message if the neighbor RAT indicator indicates the transmission of the neighbor RAT information. The neighbor RAT message includes the neighbor RAT information used to perform inter-RAT measurement and is referred to as a second message. The following table shows an example of fields included in the neighbor RAT message.

TABLE 2

| Field | | Content |
| --- | --- | --- |
| Message ID | | ID of neighbor RAT message |
| Neighbor RAT info. | RAT type | Type of neighbor RAT |
| | Boundary | Report whether it is located at boundary of neighbor RAT |
| | Length of Neighbor RAT record | Length of neighbor RAT record field |
| | Neighbor RAT record | Record on neighbor RAT |
| | Priority | Priority of neighbor RAT |

A 'RAT type' field indicates a type of the neighbor RAT, e.g., E-UTRAN or UTRAN. A 'Boundary' field indicates whether the MT is located at the boundary of the neighbor RAT. For example, if the 'Boundary' field is set to '1', the MT is located at the boundary of the neighbor RAT and begins inter-RAT measurement. If the 'Boundary' field is set to '0', the MT is not located at the boundary of the neighbor RAT and thus does not perform inter-RAT measurement. A 'Length of Neighbor RAT record' field indicates a length of 'Neighbor RAT record'. A 'Neighbor RAT record' field indicates a record on the neighbor RAT, e.g., a record on previous access to a neighbor RAT. A 'Priority' field indicates a priority of the neighbor RAT in cell re-search. This field is used to handover first to a RAT having a high priority when a plurality of neighbor RATs are present.

In another example, the neighbor RAT message may include neighbor RAT information on one or more neighbor RATs. The following table shows an example of fields included in the neighbor RAT message in this case.

TABLE 3

| Field | Content |
| --- | --- |
| Message ID | ID of neighbor RAT message |
| Number of Neighbor RAT | Number of neighbor RATs |
| Neighbor RAT 1 | Information on first neighbor RAT |
| ... | |
| Neighbor RAT n | Information on n-th neighbor RAT |

A 'Number of Neighbor RAT' field indicates the number of neighbor RATs. Information on each neighbor RAT is included as many as the number of neighbor RATs.

An RAT transmission period may be used so that the MT receives the neighbor RAT message after receiving the QuickConfig message. The RAT transmission period is a period for transmitting the neighbor RAT message. When the neighbor RAT indicator is set, the MT determines whether the neighbor RAT message is received in every RAT transmission period. The RAT transmission period may be a predetermined value, or may be reported by the network to the MT.

Alternatively, an RAT supervision timer may be used so that the MT receives the neighbor RAT message after receiving the QuickConfig message. For example, the MT starts or restarts the RAT supervision timer when the neighbor RAT indicator is set. Whether the neighbor RAT message is received is monitored while the RAT supervision timer is running. The RAT supervision timer stops upon receiving the neighbor RAT message. If the neighbor RAT message is not received until the supervision timer expires, the reception of the neighbor RAT message is regarded as a failure. A value of the RAT supervision timer may be a predetermined value, or may be reported by the network to the MT.

In step S430, the MT performs inter-RAT measurement on the basis of the neighbor RAT information included in the neighbor RAT message.

Figure 5:
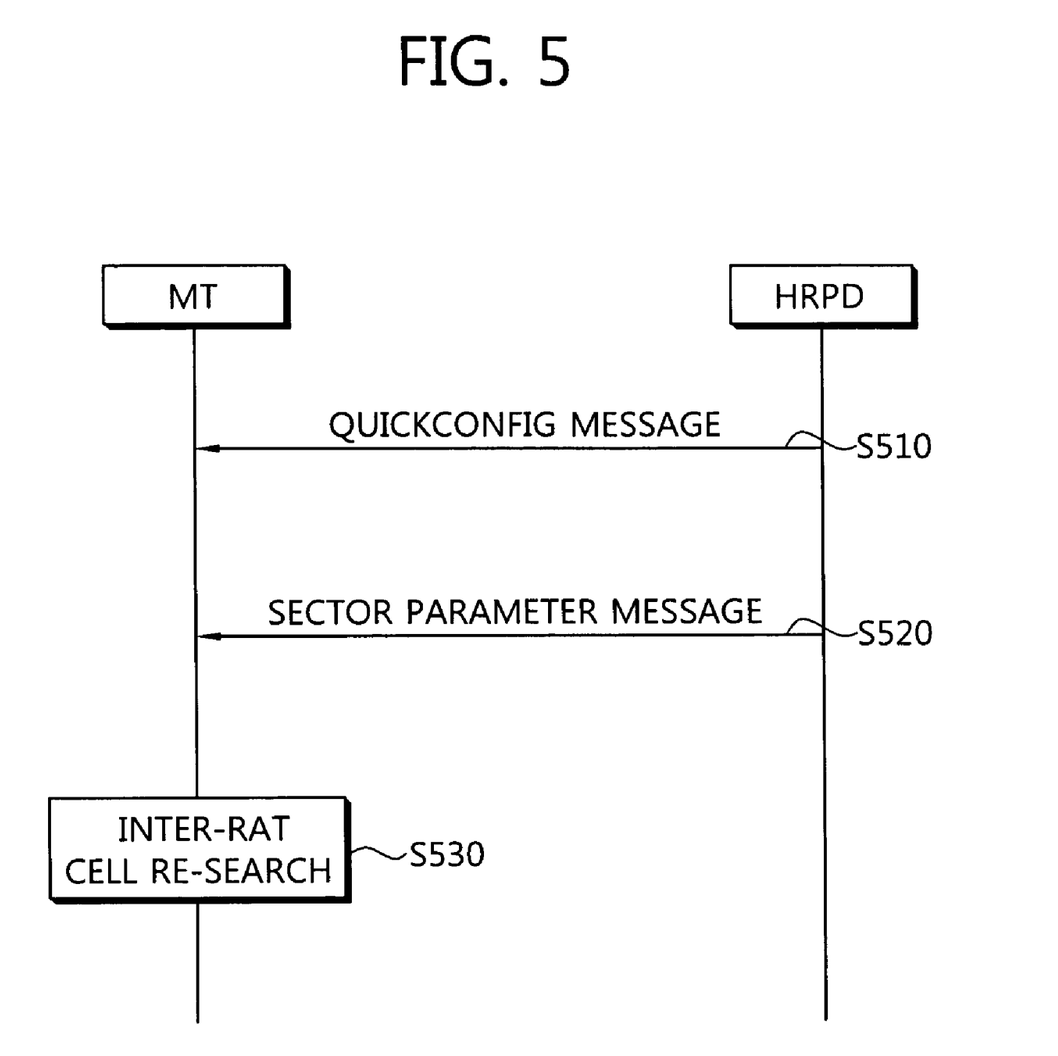
FIG. 5 is a flowchart showing transmission of neighbor RAT information according to an embodiment of the present invention.

FIG. 5 is a flowchart showing transmission of neighbor RAT information according to an embodiment of the present invention. In step S510, an HRPD network transmits a Quick-Config message. The QuickConfig message may includes information on whether a neighbor RAT message that carries neighbor RAT information is transmitted. The following table shows an example of fields included in the QuickConfig message.

TABLE 4

| Field | Content |
| --- | --- |
| Message ID | ID of QuickConfig message |
| Sector ID | Sector ID corresponding to current sector |
| Sector Signature | Signature value of next sector parameter message |
| Access Signature | Signature value of access parameter message |

A sector signature field includes a sector signature value of a next sector parameter. The sector signature field indicates to the MT whether the neighbor RAT information is the most updated and whether the MT needs to read the next sector parameter message.

In step S520, the HRPD network transmits the sector parameter message including the neighbor RAT information. According to clause 7.11.6.2.2 of the 3GPP2 C.S0024, the sector parameter message is used to deliver sector specific information to the MT. The neighbor RAT information is included in an existing sector parameter message without having to configure an additional message.

The following table shows fields of the sector parameter message including the neighbor RAT information.

TABLE 5

| Field | Content |
| --- | --- |
| Message ID | ID of sector parameter message |
| Sector ID | Sector address ID |
| Sector Signature | Signature of sector parameter message. This field shall be modified by a network when content of the sector parameter message is modified. |
| Number of Neighbor RAT | Number of neighbor RATs |
| Neighbor RAT 1 | Information on first neighbor RAT |
| ... | |
| Neighbor RAT n | Information on n-th neighbor RAT |

A sector signature field is modified when the content of the sector parameter message is modified. The sector signature field is set to the same value as in the sector signature field in the QuickConfig message. A 'Neighbor RAT' field is information on each neighbor RAT, and may include a portion or entirety of the content included in the 'Neighbor RAT' of Table 2.

The MT receives the sector parameter message as follows. Upon receiving the QuickConfig message, the MT determines whether the sector signature field included in the QuickConfig message matches with a sector signature field of a previous QuickConfig message. If the two sector signature fields do not match with each other, the MT receives a sector parameter message corresponding to the sector signature field included in the QuickConfig message.

In step S530, the MT performs inter-RAT measurement by using the neighbor RAT information included in the sector parameter message.

A first message which carries the Neighbor RAT Indicator may be unicast by the network. The following table shows an example of fields included in the first message.

TABLE 6

| Field | Content |
| --- | --- |
| Message ID | Identifier (ID) of the first message |
| Neighbor RAT Indicator | Indicates transmission of a second message which includes neighbor RAT information |
| Signature | Set to the same value as in a signature of the second message |
| Unicast ID | ID for a specific MT or ID for a group of MTs |

A 'unicast ID' may be a ID for a specific MT to receive the neighbor RAT information or a ID of a group of MTs to receive the neighbor RAT information.

When the first message is a unicast message, the second message which carries the neighbor RAT information may be unicast by a network. The following table shows an example of fields included in the second message.

TABLE 7

| Field | Content |
| --- | --- |
| Message ID | Identifier (ID) of the second message |
| Neighbor RAT information | Information on at least one neighbor RAT |
| Signature | Set to the same value as in a signature of the first message |
| Unicast ID | ID for a specific MT or ID for a group of MTs |

The message fields shown in Table 1 to Table 7 of the aforementioned embodiments are for exemplary purposes only. These fields are not all necessary, and thus some of them may be omitted and other fields may be combined. A field name and a field length may be modified, and technical features of the present invention are not limited the field name and the field length.

A mobile terminal can perform cell re-search according to neighbor radio access technology (RAT) information. Power consumption caused by measurement of a neighbor RAT can be reduced. Accordingly, a handover can be effectively performed between heterogeneous networks.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for receiving inter-radio access technology (RAT) information in a wireless communication system, performed by a mobile terminal, the method comprising:
    accessing to a high rate packet data (HRPD) network;
    receiving a QuickConfig message from the HRPD network, the QuickConfig message comprising a sector signature, a neighbor (RAT indicator and an RAT transmission period, the sector signature indicating a value of a sector signature of a next sector parameter message, the neighbor RAT indicator indicating whether or not a neighbor RAT message is transmitted from the HRPD network, the RAT transmission period indicating a transmission period of the neighbor RAT message when the neighbor RAT indicator indicates the transmission of the neighbor RAT message; and
    receiving the neighbor RAT message in the transmission period from the HRPD network if the neighbor RAT indicator indicates the transmission of the neighbor RAT message, the neighbor RAT message comprising neighbor RAT information, the neighbor RAT information including a RAT type and a neighbor RAT record, the RAT type indicating a type of a neighbor RAT, the neighbor RAT record indicating a record of the neighbor RAT.

2. The method of claim 1, wherein the QuickConfig message is broadcast by the HRPD network.

3. The method of claim 1, wherein the neighbor RAT message is broadcast by the HRPD network.

4. The method of claim 1, wherein the neighbor RAT indicator is one bit information, and the neighbor RAT indicator is set to '1' when the neighbor RAT indicator indicates the transmission of the neighbor RAT message.

5. A mobile terminal configured for receiving inter-radio access technology (RAT) information in a wireless communication system, the mobile terminal comprising:
    a first RAT modem for supporting a first RAT;
    a second RAT modem for supporting a second RAT; and
    a controller operatively coupled with the first RAT modem and the second RAT modem, and configured to:
        access to a first RAT which is a high rate packet data (HRPD) network;
        receive a QuickConfig message to indicate a change in a neighbor RAT message from the HRPD network, the QuickConfig message comprising a sector signature, a neighbor RAT indicator and an RAT transmission period, the sector signature indicating a value of a sector signature of a next sector parameter message, the neighbor RAT indicator indicating whether or not the neighbor RAT message is transmitted from the HRPD network, the RAT transmission period indicating a transmission period of the neighbor RAT message when the neighbor RAT indicator indicates the transmission of the neighbor RAT message; and
        receive the neighbor RAT message in the transmission period from the HRPD network if the neighbor RAT indicator indicates the transmission of the neighbor RAT message, the neighbor RAT message comprising neighbor RAT information, the neighbor RAT information including a RAT type and a neighbor RAT record, the RAT type indicating a type of a neighbor RAT, the neighbor RAT record indicating a record of the neighbor RAT.

6. The mobile terminal of claim 5, wherein the QuickConfig message is broadcast by the HRPD network.

7. The mobile terminal of claim 5, wherein the neighbor RAT message is broadcast by the HRPD network.

8. A method for transmitting inter-radio access technology (RAT) information in a wireless communication system, performed by a base station, the method comprising:
    transmitting a QuickConfig message to indicate a change in a neighbor RAT message to a mobile terminal, the QuickConfig message comprising a sector signature, a neighbor RAT indicator and an RAT transmission period, the sector signature indicating a value of a sector signature of a next sector parameter message, the neighbor RAT indicator indicating whether or not the neighbor RAT message is transmitted from the base station, the RAT transmission period indicating a transmission period of the neighbor RAT message when the neighbor RAT indicator indicates the transmission of the neighbor RAT message; and
    transmitting the neighbor RAT message in the transmission period to the mobile terminal if the neighbor RAT indicator indicates the transmission of the neighbor RAT message, the neighbor RAT message comprising neighbor RAT information, the neighbor RAT information including a RAT type and a neighbor RAT record, the RAT type indicating a type of a neighbor RAT, the neighbor RAT record indicating a record of the neighbor RAT.

* * * * *